United States Patent [19]

Shraiman et al.

[11] 4,031,809
[45] June 28, 1977

[54] METHOD OF MACHINING CURVILINEAR SURFACES

[76] Inventors: Evgenia Isaevna Shraiman; Isai Beniaminovich Shraiman, both of ulitsa Saltykova-Schedrina, 23, kv. 10; Eduard Iosifovich Tsesevich, Liteiny prospekt, 34, kv. 17; Viktor Leonidovich Dobroslavsky, ulitsa Varshavskaya, 110, kv. 5; Nikolai Ivanovich Ivanov, prospekt Kultury, 15, korpus 2, kv. 64; Pavel Pavlovich Lebedev, prospekt Morisa Toreza, 80, kv. 99, all of Leningrad, U.S.S.R.

[22] Filed: Oct. 10, 1975

[21] Appl. No.: 621,616

[30] Foreign Application Priority Data

Oct. 14, 1974  U.S.S.R. .......................... 2079351

[52] U.S. Cl. .............................. 90/11 C; 90/13.3; 90/13.6; 90/13.9
[51] Int. Cl.[2] .......................................... B23C 3/04
[58] Field of Search ............... 90/11 R, 13 A, 13.6, 90/13.7, 13.8, 11 C, 13.9

[56] References Cited

UNITED STATES PATENTS

| 2,113,716 | 4/1938 | Berliner | 90/13.7 |
|---|---|---|---|
| 2,593,363 | 4/1952 | Thalman | 90/13.7 |
| 2,660,930 | 12/1953 | De Vlieg et al. | 90/13 A |
| 2,826,123 | 3/1958 | Leverington | 90/11 C |
| 3,413,890 | 12/1968 | Wingquist | 90/13 A |
| 3,641,872 | 2/1972 | Ulfhielm | 90/11 C |
| 3,741,070 | 6/1973 | Berthiez | 90/11 C |

FOREIGN PATENTS OR APPLICATIONS 1,104,291  11/1955  France .................. 90/13 A Primary Examiner—Richard B. Lazarus
Assistant Examiner—William R. Briggs

[57] ABSTRACT

Workpieces of the type of turbine blades are machined with a rotating mill while rotating a blank about its axis X with relative displacements of the blank and mill along the axes X, Y and Z. The mill is positioned relative to the workpiece in such a manner that its rotational axis forms, with a line normal to each profiled point of the workpiece, an angle which is substantially smaller than a right angle, whereby the mill shapes curvilinear surfaces of the workpiece with the end portion thereof. The method according to the invention permits machining of the working profile of a workpiece of the type of turbine blades, conjugation surfaces of the profile smoothly mating the working profile and the adjacent elements of the blade and these elements proper with one and the same mill with a single positioning of the blank. The tool may comprise mills adapted for operation with the end face thereof, in particular, plane end face mills.

9 Claims, 21 Drawing Figures

METHOD OF MACHINING CURVILINEAR SURFACES

The present invention relates to methods of machining curvilinear surfaces of workpieces, and more particularly to methods of machining curvilinear surfaces of workpieces of the type of turbine blades by circular milling.

The invention may be widely used in the power engineering, aviation industry and shipbuilding, mainly in machining turbine blades, propeller blades and detachable ship propeller blades.

It is widely known to machine curvilinear surfaces of workpieces of the type of turbine blades by circular milling, wherein, during the rotation of a blank and a mill, relative displacements are imparted thereto along the rotational axis of the blank and, in accordance with a preset programme or from a cam, also the displacement of profile generation having the direction at an angle from about 45° to about 135° with respect to the axis of the blank rotation.

Now, the reference is made to this known method as applied to the machining of turbine blades.

The process of machining of a turbine blade is usually started from the head portion thereof, wherein the cross-sectional area is minimal, and towards the blade root with the blank rotating continuously about the clamping axis thereof (which is the rotational axis thereof) and concurrent continuous relative displacement of the blank and mill taking place, the mill performing the generation of the profile moving in the direction at an angle from about 45° to about 135° with respect to the blank axis. As a result of removal of metal from the blank, a working profile of a turbine blade having a lip and a trailing edge is formed. A curvilinear line of contact between the blank and the mill which is formed on the turbine blade during the milling has a shape of helix beginning at the head portion of the blade and terminating in the blade root.

Therefore, after the milling, milling lines are visible on the turbine blade which extend in the transverse direction and form combs on the machined surface.

The distance between the lines is generally not greater than 2.5 mm. The comb height should comply with a desired surface finish. The comb size depends both on the distance between the adjacent lines and on the shape of the cutting portion of a mill and curvature of the blade in both transverse direction (curvature of cross sections of the blade) and longitudinal direction.

It is known that the cross-section of a turbine blade is frequently variable in length, and in addition, the blades are often made warped.

The above-described known machining method involves such a positioning of the mill relative to the turbine blade that the rotational axis of the mill forms with the rotational axis of the blank an angle which is substantially smaller than right angle. Thus, the milling is effected with the profile portion of the mill, that is the cylindrical milling occurs.

Therefore, the known method provides for machining of curvilinear surfaces of workpieces of the type of turbine blades with a mill operating on the principle of the cylindrical milling, and the following disadvantages are inherent in this known method.

The known method permits machining of the working profile of a turbine blade, but it does not enable machining of conjugation surfaces, which smoothly mate the working profile with other surfaces of the blade, with one and the same mill. It should be noted that incompletely machined portions remain on the parts of the working profile adjacently to the conjugation surfaces due to the fact that the mill positioned relative to a workpiece for operation in accordance with the cylindrical milling process does not permit the cutting portion thereof approaching these machining zones.

The positioning of the mill axis, as mentioned above, at an angle to the rotational axis of a blank which is substantially smaller than right angle results in an increased offset of a mandrel supporting the mill thus resulting in lower stiffness and reduced vibration stability of the mill and hampering the milling performance, and hence in reduced productivity of the machining method.

The positioning of the mill relative to the blank in accordance with the cylindrical milling operation results in that in machining the working profile of a blade (except for the edges), cutting forces act in the direction of the minimum transverse stiffness of the blade so that the milling performance parameters are to be lowered, thereby reducing the productivity.

In machining the blades having a low transverse stiffness, a considerable bending of blades takes place. This calls for the provision of supports arranged between the head portion and blade root. The need for using additional supports arises in certain applications, when machining blades with the length of the working profile of about 500 mm. At the same time, the demand for blades having a length of the working profile of up to 1500 mm and more requires the employment of additional supports in machining a wide range of blade sizes thus complicating the construction of milling machines.

The conditions of operation of a mill by the known method restrict the selection of the mill radius. The mill radius should be substantially 0.75–0.85 of the minimum radius of the internal profile of a blade which is the portion of the blade between the edges thereof having a negative curvature in transverse sections. This necessitates different mill sizes for different sizes of blades which rises the production cost of turbine blades.

Continuous unidirectional rotation of the blank and relatively small difference in the mill and blade radius at the side of the internal profile result in an increased load on the blank during the milling of the internal profile of the blade which cannot be sufficiently reduced by lowering the rotational speed of the blank. This leads to the need for reducing the width of the milling line, thereby resulting in a lower productivity.

It is an object of the invention to eliminate the above disadvantages.

The main object of the invention is to provide a method for machining curvilinear surfaces of workpieces of the type of turbine blades by milling involving such relative displacements of the blank and mill and such relative positioning thereof that cutting forces developed during the machining at each profiled point of the surface should act substantially in the direction of maximum transverse stiffness of the workpiece.

Another important object of the invention is to provide the above-described method which ensures a high surface finish with an increased line width.

Still another not least important object of the invention is to provide the above-described method exhibiting high productivity with high surface finish.

The above and other objects are accomplished in a method for machining curvilinear surfaces of workpieces of the type of turbine blades by circular milling, wherein, during relative rotation of blank and mill, a relative movement is imparted thereto along the rotational axis of the blank, as well as a profile generation movement in the direction at an angle from about 45° to about 135° with respect to the rotational axis of the blank. According to the invention, a relative movement is imparted to the blank and mill in the direction at substantially right angle with respect to the rotational axis of the blank and to the direction of the profile generation, and the mill is positioned relative to the surface being machined in such a manner that the angle between the axis thereof and a line normal to each profiled point of the surface should be substantially smaller than a right angle, whereby the workpiece profile is generated by the end face of the mill.

The above-described relative positioning of the blank and mill and the relative displacements thereof contribute to positioning of the end face of the mill closer to the curvilinear surface of a workpiece being machined. Thus, cutting forces act substantially in the direction of maximum transverse stiffness of workpieces of the type of turbine blades.

Due to the reduction of forces bending the workpiece the line width may be increased, which enables an improvement of productivity of the machining method according to the invention. At the same time, the above-mentioned positioning of the end face of a mill closer to the curvilinear surface being machined contributes to a smaller height of combs so that with a considerable line width the comb height remains within preset surface finish tolerances. Therefore, with a high productivity of the method according to the invention, a high quality of surface finish is obtained.

For successful accomplishment of the objects of the invention, the relative positioning of the blank and mill is preferably modified by turning them about an axis substantially normal to the rotational axes of the blank and mill.

Such turning action pemits a better positioning of the end face of the mill and the surface being machined into a closer relationship thus providing for an increased line width and thereby improving the productivity, while obtaining high quality of the surface being machined.

At convex portions of a workpiece, that is at the portions having a positive curvature in transverse sections, the relative positioning of the mill and blank is preferably modified by displacing them in a plane tangent to the workpiece at each profiled point of this portion in the direction of the resultant motion of the relative displacements of the blank and mill. This displacement provides for reduced height of combs at the convex portions of the workpiece profile thereby enabling an increase in the line width, while maintaining high quality of the surface being machined.

At concave portions of a workpiece, that is at the portions having a negative curvature, conjugation surfaces mated with the profile of such a portion are preferably generated by relative displacement of the blank and mill with successive profiling of the points of these surfaces beginning from the intermediate part of a respective concave portion of the workpiece towards the edges thereof.

As a result of this sequence of machining of the conjugation surfaces at the concave portions of the workpiece, the length of the cutting portions of the mill, as well as the length of a mandrel supporting the mill may be reduced. This provides for a high stiffness of the system tool-workpiece-machine and the vibration stability of the system thereby ensuring higher cutting performance parameters and improving the productivity of the machining method according to the invention, while obtaining a high quality of the surface being machined.

A relative alternating motion is preferably imparted to the blank and mill along the blank axis. This provides for evening the line width at the convex and concave portions of the workpiece, including the edges thereof and for eliminating idle passes, whereby the productivity of the machining method is improved, while obtaining high quality of the surface being machined.

The invention will be better understood from the following description of specific embodiments thereof illustrated in the accompanying drawings, in which:

FIG. 1 diagrammatically shows relative arrangement of a blank (some transverse sections are conventionally shown with dotted line) and mill and the directions of their relative displacements during circular milling of the working profile of a turbine blade according to the invention;

Figures 8, 9, 10, 11:
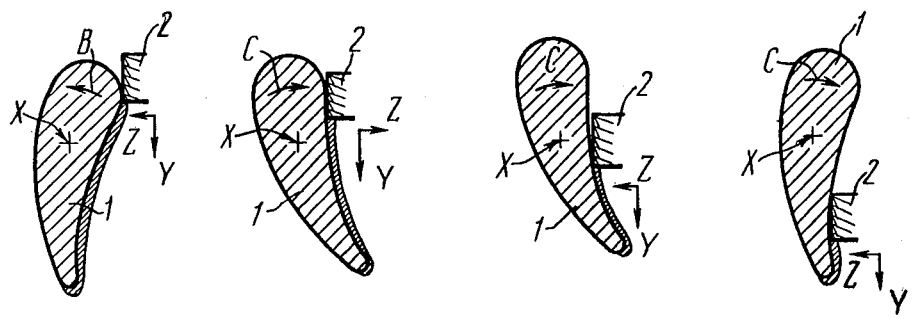
Figures 12, 13, 14:
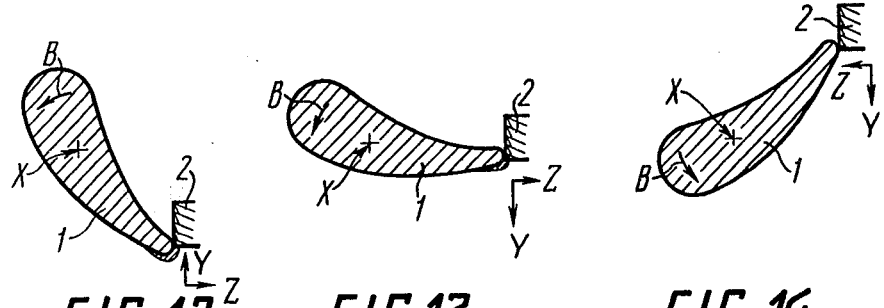
Figure 15:
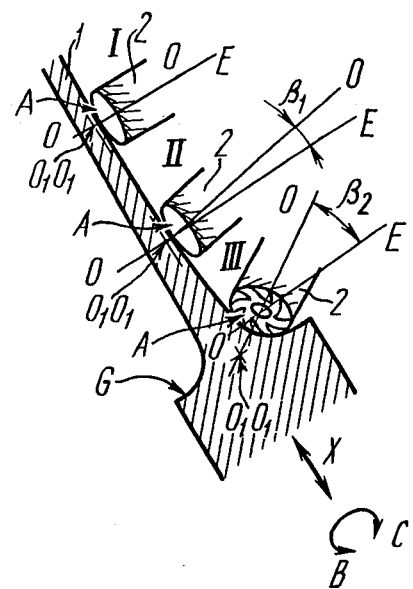
Figure 20:
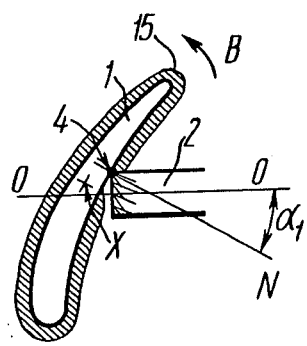
Figure 21:
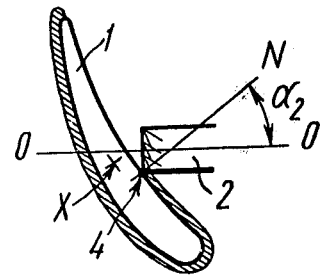
Figure 16:
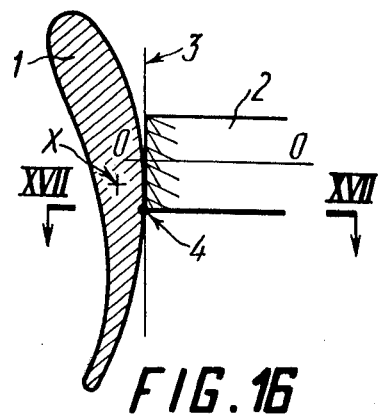
Figure 18:
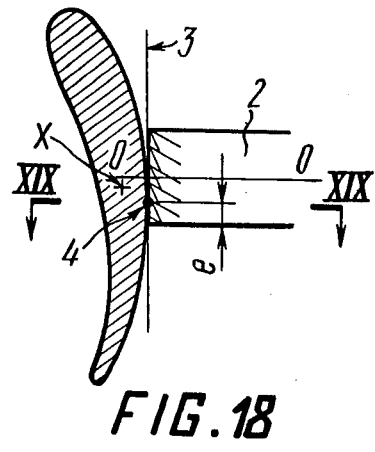
Figure 17:
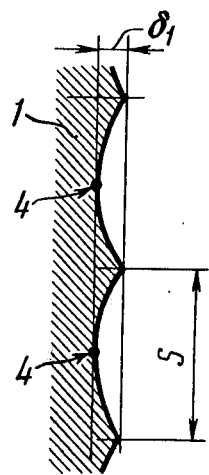
Figure 19:
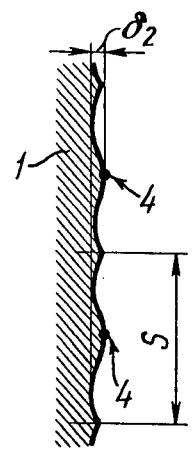

FIGS. 9, 10, and 11 show the same relative arrangements, but for milling the internal profile of a turbine blade according to the invention;

FIGS. 12, 13, and 14 show the same relative arrangements, but for milling the trailing edge of a turbine blade according to the invention;

FIG. 15 shows a blank (in an axial section) and, conventionally, three positions of a mill relative thereto according to the invention;

FIG. 16 shows a relative arrangement of a blank (in cross-section) and mill according to the invention;

FIG. 17 is a sectional view taken along the line XVII—XVII in FIG. 16;

FIG. 18 shows a position of a blank (in transverse section) and mill displaced relative thereto in a tangent plane to a turbine blade at a profiled point according to the invention;

FIG. 19 is a sectional view taken along the line XIX—XIX in FIG. 18;

FIG. 20 shows a relative arrangement of a turbine blade (in transverse section) and mill during the milling of conjugation surfaces on the side of the concave portion of the profile beginning from the intermediate part thereof towards the trailing edge according to the invention;

FIG. 21 shows the same view as in FIG. 20, but in the direction of the lip.

According to the invention, it is contemplated a method for machining curvilinear surfaces of workpieces of the type of turbine blades by circular milling.

The method according to the invention may be employed for machining either turbine blades or propeller blades and detachable ship propeller blades.

A blank 1 (FIG. 1) is secured for milling for rotation about an axis X and for displacement along this axis. A mill 2 is mounted for displacement along an axis Z at an angle from about 45° to about 135° with respect to the axis X (rotational axis) of the blank.

Alternatively, the displacement along the axis X may be imparted to the mill rather than to the blank. The displacement along the axis Z may as well be imparted to the blank rather than to the mill.

In this specific example, the axis Z is at a right angle to the axis X of rotation of the blank.

According to the invention, the mill 2 is displaceable along an axis Y which is at substantially a right angle with respect to the rotational axis X of the blank and to the axis Z.

Alternatively, the blank 1 may be displaceable along the axis Y rather than the mill 2.

In this embodiment, the angle formed by the axis Y with the axes X and Z is right angle. Thus the axes X, Y, Z define a rectangular coordinate system.

According to the invention, the mill 2 is positioned relative to the surface being machined in such a manner that the angle between the mill axis and a line 00 normal to each profiled point of the surface should be substantially smaller than a right angle, whereby the surface of a workpiece is shaped with the end face of the mill 2.

In this embodiment, to comply with this condition, the rotational axis 00 of the mill extends in parallel with the axis Z.

During the milling, the mill 2 performs simultaneous motions along the axes Y and Z, and the blank 1 rotates about the axis X and moves therealong. Due to all above-mentioned displacements, the curvilinear surfaces of a workpiece may be shaped with the end face of the mill.

Now the reference is made to detailed description of a process of circular milling of the working profile of a turbine blade.

For milling the working profile of a turbine blade, a mill adapted for machining with the end face thereof should be used, such as an end mill with a flat end face without taper.

Alternatively, a mill of the above-mentioned type with taper or a mill of a different shape may be used.

The reference is now made to the process of formation of an individual transverse section of the working profile of a turbine blade by generation of the blank with the mill with a relative displacement of the blank and mill.

Each point of the section under consideration is profiled at such angular position of the blank about the axis X that the tangent plane to the working profile of the blade at this point should be at an angle to the plane of the mill end face which is substantially smaller than 90°. By displacing the blank 1 along the axis X and the mill 2 along the axes Y and Z, the contact of the mill end face with the profiled point of the blank may be provided at every moment of time. By successively profiling the transverse section of the working profile of the turbine blade, a line of the surface thereof is machined. Two adjacent lines form a comb on the surface of the working profile of the turbine blade.

Figure 2:
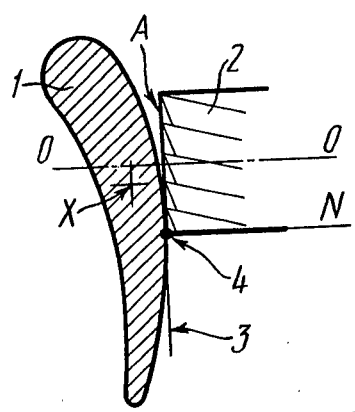
FIG. 2 shows relative arrangement of a blank (in transverse section) and mill during the milling of the external profile of a turbine blade according to the invention.

It is common knowledge that the smaller the angle between the tangent plane 3 (FIG. 2) to the surface being machined and the end face A of the mill, or which is the same the smaller the angle between a line normal to the profiled point of the machined surface and the rotational axis of the mill, the closer the operating conditions of the mill to the end milling conditions wherein cutting forces act substantially along a tangent line to the machined surface.

As applied to the machining of the working profile of turbine blades this corresponds to the action of cutting forces at the portions of the external and internal profile substantially in the direction of maximum transverse stiffness of the turbine blade.

The action of cutting forces during the shaping of the working profile of a blade in performing circular milling thereof substantially in the direction of maximum transverse stiffness considerably reduces bending of the blade. Thus, the range of blade sizes requiring the employment of intermediate supports during the milling is considerably narrowed.

Due to a reduction of forces bending the workpiece, the line width may be increased. Thus, the closer relative positioning of the end face of the mill and the curvilinear surface being machined contributes to the reduction of comb height. Therefore, with a substantial width of a line (up to 10 mm), the comb height remains within the limits of a preset surface finish tolerance.

At each profiled point of the surface the value of the angle between the end face A of the mill 2 and the tangent plane 3 may be modified by turning the blank about the axis X.

For turbine blades having a constant section working profile without warping, in machining the external profile, the tangent plane 3 to the workpiece at each profiled point 4 may be made to coincide with the end face plane A of the mill 2. A line N normal to each profiled point 4 remains parallel with the rotational axis 00 of the mill 2.

Figure 3:
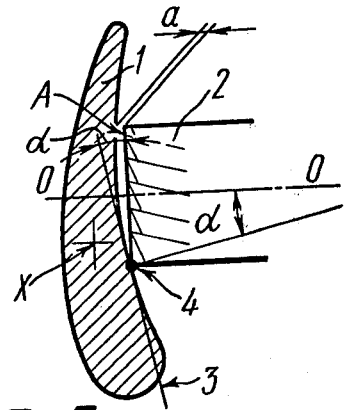
FIG. 3 shows the same relative arrangement but for milling the internal profile of a turbine blade according to the invention.

In machining the internal profile of such turbine blades, a positive spacing A (FIG. 3) between the blade and mill should be provided to prevent a secondary cutting (undercutting) of profiled portion of the blade surface. It should be noted that the spacing A may be obtained by turning the blank about the axis X in such a manner that the angle between the tangent plane 3 to the profiled point 4 should be equal to $\alpha$, or, which is the same, the angle between the line N normal to the profiled point and the rotational axis 00 of the mill should be equal to $\alpha$.

In milling blades of variable profile and blades with warping, the value of the angle $\alpha$ between the end face A of the mill 2 and the tangent line 3 at each profiled point 4 is selected on the basis of the condition that a secondary cutting (undercutting) of profiled portion of the blade should be prevented.

The reduction of the angle $\alpha$, as mentioned above, contributes to the action of cutting forces at the portions of the external and internal profile of the blade substantially in the direction of maximum transverse stiffness thereof. This facility provides for improvement of vibration stability during the milling. At the same time, the smaller the angle $\alpha$, the smaller the height of the comb defined by two adjacent milling lines.

Thus, the width of the milling lines may be increased, while obtaining high quality of the machined surface.

Due to the fact that the milling process in accordance with the method of the invention provides for a high vibration stability of the shape generation of workpieces of the type of turbine blades, a higher productivity of the machining method is obtained with an increased line width (up to 10 mm and more) and with high-speed cutting performance.

During the profiling of the transverse section of the working profile of the turbine blade, the mill 2 successively generates all portions of the profile, including the edges. FIGS. 4–14 show an embodiment of generation of a transverse section of a constant section blade without warping with a mill and a number of relative positions of the blank 1 (transverse section) and mill 2, as well as the machining allowance removed during the profile generation. Arrows in these figures show the direction of the mill displacement along the axes Y and Z, and the arrow B shows the rotational direction of the blank 1 about the axis X at each of the shown positions of the generation. There is no displacement of the blank along the axis X for this specific shape of the blade.

Figures 4, 5, 6, 7:
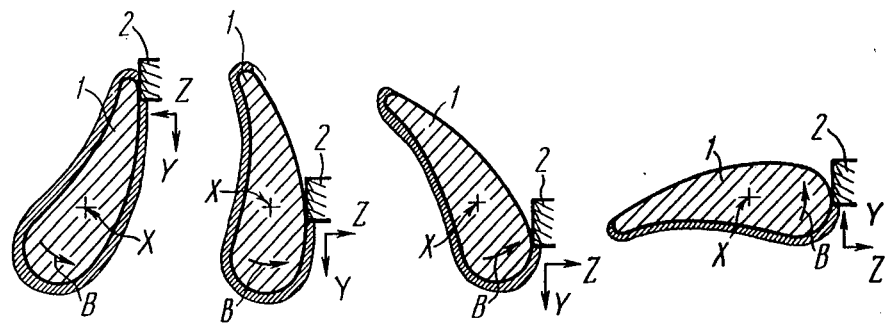
FIGS. 4, 5 and 6 show relative arrangements of a blank (in transverse section) and mill and the direction of displacement thereof during the milling of the external profile of a turbine blade according to the invention.
FIGS. 7 and 8 show the same relative arrangements, but for milling of the lip of a turbine blade according to the invention.

FIGS. 4, 5, 6 show three successive positions of generation in machining the external profile of a turbine blade at the beginning of the external profile at the trailing edge, intermediate of the external profile and at the end of the external profile, at the lip, respectively. During generation of the external profile, the blank 1 rotates about the axis X in the direction B counterclockwise, the displacement of the mill 2 along the axis Z alternates in its direction, and the displacement of the mill 2 along the axis Y is unidirectional.

During generation of the lip, the direction B (FIGS. 7, 8) of rotation of the blank 1 about the axis X remains unchanged, and the direction of displacement of the mill 2 along the axis Y becomes alternating.

During generation of the internal profile, the rotation of the blank 1 (FIGS. 9, 10 and 11) about the axis X is reversed (arrow C). The displacement of the mill 2 along the axes Y and Z remains alternating.

When transiting to generation of the lip, the rotation of the blank 1 (FIG. 12) about the axis X is again reversed and becomes the same as the direction B.

Further, during generation of the trailing edge, the rotation of the blank 1 (FIGS. 13, 14) remains counterclockwise, that is in the direction B.

During generation of a transverse section of the working profile of a variable section turbine blade with warping, the blank 1 (FIG. 1) is displaced along the axis X simultaneously with rotation thereabout, and this displacement is alternating. The rotation of the blank 1 about the axis X is also alternating. The mill 2 is also alternatingly displaced along the axes Y and Z.

The transition from one line to another may be either discrete (with separation of the mill from the blank surface upon transition to the adjacent line) using the displacements along the axes X, Y, Z and rotation of the blank about the axis X, or without separation), or continuous, wherein a curve of contact between the blank and mill which is formed on the turbine blade during the milling is of a helical shape, the helix beginning from the head portion of the blade and terminating in the blade root.

The method according to the invention enables the machining of conjugation surfaces mating the working profile of the blade with the flat elements of the blade extending at a right angle to the rotational axis X. The above-described mill with flat end face without taper may also be used for machining these surfaces.

In machining the above-mentioned conjugation surfaces, the blank only rotates about the axis X and is not displaced along this axis. In this case, the mill 2 (FIG. 3) forms a line on the working surface of the blade with the periphery of the end face A, the line comprising a series of points belonging to different transverse sections of the working profile of the blade while concurrently forming a conjugation surface adjoining a surface D (FIG. 1) which is machined with the peripheral cylindrical surface thereof.

Accordingly, the value of the angle $\alpha$ (FIG. 3) between the end face A of the mill 2 and the tangent plane 3 at each of the points forming the line on the working surface of the blade depends on the shape of the conjugation surface and radius of the mill 2.

Alternatively, concurrent machining of the conjugation surface and the surface D adjoining it may be performed using a mill of a different shape. Thus, in machining conjugation surfaces of a small radius of curvature, a mill having a rounded portion adjacent to the end face thereof is preferably used, with the radius of the rounded portion about equal to the radius of curvature of the conjugation surface.

According to the invention, in machining variable section blades with warping, the provision is preferably made for relative turning of the blank 1 and mill 2 about an axis $O_1O_1$ (FIG. 1) substantially normal to the rotational axes X and OO of the blank and mill, respectively.

In this embodiment, the blank 1 is rotatable about the axis $O_1O_1$ intersecting the axis X of the blank at right angle and extending in parallel with the axis Y.

Alternatively, the mill may be turned about an axis extending in parallel with the axis Y and intersecting the axis OO of the mill at right angle.

FIG. 15 shows an axial section of the blade with rotational axis X and, conventionally, three positions I, II and III of the mill corresponding to different portions of the working profile of the turbine blade having different steepness in axial sections.

In case of a small axial steepness of the turbine blade profile, the turning of the blade about the axis $O_1O_1$ may be substantially eliminated. Thus, the axis OO of the mill (position I) extends in parallel with a plane E normal to the rotational axis X of the blank and extending through a profiled point of the blade surface.

In case of an increase in the axial steepness of the turbine blade, it is desirable, in order to reduce the angle between the end face A of the mill 2 and the tangent plane to the blade surface at the profiled point, to turn the blank about the axis $O_1O_1$ in such a manner that the axis OO of the mill (position II) should form an angle $\beta_1$ with the plane E.

The value of the angle $\beta_1$ is selected on the basis of the condition providing for an optimum positioning of the end face A of the mill 2 closer to the machined surface.

Thus, the cutting forces act in the direction of maximum transverse stiffness of the blade thus resulting in a high degree of vibration stability of the shaping process. At the same time, the above-mentioned positioning of the end face of the mill and the machined surface closer to each other provides for obtaining a wide (100mm and more) milling line, while maintaining a high surface finish. Due to a high vibration stability of the machining method according to the invention, the milling performance parameters in shaping turbine blades may be increased thereby improving the productivity of the machining method.

Figure 1:
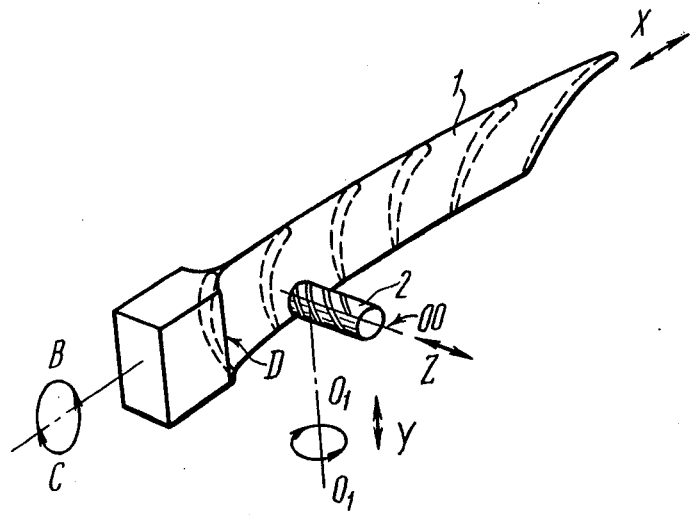

In the position III, the mill 2 performs machining of a conjugation surface from the working profile of the blade to a surface G, which is plane in this embodiment, but as differed from the surface D of FIG. 1, this surface forms an angle other than right angle with the axis X.

In this case, the blank 1 is preferably turned about the axis $0_1 0_1$ at an angle $\beta_2$. The value of the angle $\beta_2$ may vary during machining of this conjugation surface and depends on the angle of inclination of the surface G with respect to the axis X.

Therefore, turning the blank about the axis $0_1 0_1$ enlarges the production capabilities of the method according to the invention, that is more complete machining of turbine blades is ensured as compared to similar known methods.

According to the invention, relative positioning of the blank and mill at the convex portions of a workpiece is preferably modified by displacing them relative to each other in a tangent line to the workpiece at each profiled point of the portion in the direction of a resultant relative displacements of the blank and mill.

This displacement is effected by moving the mill along the axes Y and Z and by moving the blank along the axis X.

FIGS. 16 and 17 show the position of the blank 1 (in transverse section) of a turbine blade of constant section without warping and the mill 2 and a section of the working profile of the blade corresponding to this position of the machining extending in parallel with the rotational axis X and including a profiled point 4.

FIG. 17 shows two adjacent lines of a width S. Surface finish of the blade surface is characterized by the comb height $\delta_1$.

FIG. 18 shows, according to the invention, the displacement of the mill 2 relative to the profiled point 4 of the blank 2 in a tangent plane 3 in the direction towards the line at a distance e.

FIG. 19 shows the surface after the machining with the above-described displacement. With the same width S of the line, the height of the comb $\delta_2$ is reduced as compared to the comb obtained in machining the blade without the above-described displacement of the mill relative to the blank.

In machining the working profile of variable section turbine blades with warping, the above-described displacement has a similar effect on the degree of surface finish.

Thus, it is possible, due to the method according to the invention, by performing said displacement of the mill relative to the blank, to increase the line width at convex portions of the working profile of a turbine blade, while obtaining high quality of machined surface.

According to the invention, conjugation surfaces mated with the working profile of a turbine blade at the concave portions thereof are preferably machined with a relative displacement of the blank and mill in performing a successive profiling of points of these surfaces beginning from the intermediate part of a respective concave portion towards the edges thereof.

FIG. 20 shows a relative arrangement of the blank 1 (in transverse section) and mill 2 during milling of a conjugation surface on the side of the concave portion of the working profile. In this case, the milling is effected beginning from the intermediate portion of the profile towards the trailing edge, and the mill 2 is inclined towards the trailing edge at an angle $\gamma_1$ with respect to a line N normal to a profiled point 4 of the working profile, the value of this angle depending on the shape of the conjugation surface and radius of the mill. FIG. 20 also shows the direction B of rotation of the blank 1 about the axis X which corresponds to the counterclockwise rotations.

FIG. 21 diagrammatically shows the machining of the opposite side of the conjugation surface at the concave portion of the working profile of a turbine blade. The blank 1 (in transverse section) rotates clockwise about the axis X, that is the rotation is in the direction C. The mill 2 is inclined with respect to the normal line N towards the lip at an angle $\gamma_2$, the value of this angle depending on the shape of the conjugation surface and radius of the mill.

Therefore, the concave portion of the conjugation surface is preferably machined in two steps with separation of the mill from the machined surface, beginning from the intermediate part thereof. As a result of such sequence of machining, the length of the cutting portion of the mill and of the mandrel supporting the mill may be reduced. This provides for a high stiffness of the system tool-workpiece-machine and vibration stability of the system which is favourable for surface finish and productivity.

According to the invention, a relative alternating motion is preferably imparted to the blank and mill along the axis X of the blank. In this specific embodiment (FIG. 1) this relative alternative motion is effected by displacing the mill 2 along the axes Y and Z and by displacing the blank 1 along the axis X and rotating it about the axes X and $0_1 0_1$.

The above-described relative motion is combined with transverse profile generation.

Due to the fact that the line width at individual portions of the working profile is different because of variable curvature of the workpiece, this facility enables evening of the line width at the external and internal portions of the working profile and at the edges thus eliminating idle passes, whereby the productivity of the method is improved, while maintaining high quality of machined surface.

We claim:

1. A method for machining curvilinear surfaces of workpieces of the type of turbine blades by circular milling comprising: rotating a blank and mill and applying thereto a profile generation displacement with respect to the rotational axis of the blank imparting to the blank and mill a relative displacement along the rotational axis of the blank and the profile generation displacement during rotation of the blank and mill, the direction of said profile generation displacement being at an angle from substantially 45° to 135° with respect to the rotational axis of the blank, said relative displacement being imparted at an angle substantially smaller than a right angle with respect to the rotational axis of the blank and to the direction of said profile generation displacement; positioning the mill relative to the surface being machined so that an angle between the mill axis and a line normal to each profiled point of the surface is substantially smaller than a right angle; and shaping the curvilinear surface of said blank with the end face of the mill.

2. A method for machining curvilinear surfaces of workpieces of the type of turbine blades by circular milling comprising: rotating a blank and mill and applying thereto a profile generation displacement with respect to the rotational axis of the blank imparting to the blank and mill a relative displacement along the rotational axis of the blank and the profile generation displacement during rotation of the blank and mill, the direction of said profile generation displacement being at an angle from substantially 45° to 135° with respect to the rotational axis of the blank, said relative displacement being imparted at an angle substantially smaller than a right angle with respect to the rotational axis of the blank and to the direction of said profile generation displacement; positioning the mill relative to the surface being machined so that an angle between the mill axis and a line normal to each profiled point of the surface is substantially smaller than a right angle; and shaping the curvilinear surface of said blank with the end face of the mill; said relative displacement of the blank and mill including the step of turning said blank and mill about an axis located substantially at a right angle to the rotational axes of the blank and mill.

3. A method according to claim 2, wherein relative displacement of the blank and mill is applied at convex portions of a workpiece by displacing blank and mill relative to each other in a tangent plane to the workpiece at each profiled point of said portion in the direction of the resultant of the relative motions of said blank and mill.

4. A method according to claim 2, including the step of imparting a relative alternating motion to the blank and mill along the blank axis.

5. A method according to claim 2, wherein conjugation surfaces at concave portion of a workpiece mating with the profile thereof are formed by relative displacement of the blank and mill in performing a successive profiling of points of said surfaces beginning from the intermediate part of a respective concave portion of the workpiece towards the edges thereof.

6. A method for machining curvilinear surfaces of workpieces of the type of turbine blades by circular milling comprising: rotating a blank and mill and applying thereto a profile generation displacement with respect to the rotational axis of the blank imparting to the blank and mill a relative displacement along the rotational axis of the blank and the profile generation displacement during rotation of the blank and mill, the direction of said profile generation displacement being at an angle from substantially 45° to 135° with respect to the rotational axis of the blank, said relative displacement being imparted at an angle substantially smaller than a right angle with respect to the rotational axis of the blank and to the direction of said profile generation displacement; positioning the mill relative to the surface being machined so that an angle between the mill axis and a line normal to each profiled point of the surface is substantially smaller than a right angle; and shaping the curvilinear surface of said blank with the end face of the mill; said relative displacement of the blank and mill being applied at convex portions of a workpiece by displacing blank and mill relative to each other in a tangent plane to the workpiece at each profiled point of said portion in the direction of the resultant of the relative motions of said blank and mill.

7. A method according to claim 5, including the step of imparting a relative alternating motion to the blank and mill along the blank axis.

8. A method for machining curvilinear surfaces of workpieces of the type of turbine blades by circular milling comprising: rotating a blank and mill and applying thereto a profile generation displacement with respect to the rotational axis of the blank imparting to the blank and mill a relative displacement along the rotational axis of the blank and the profile generation displacement during rotation of the blank and mill, the direction of said profile generation displacement being at an angle from substantially 45° to 135° with respect to the rotational axis of the blank, said relative displacement being imparted at an angle substantially smaller than a right angle with respect to the rotational axis of the blank and to the direction of said profile generation displacement; positioning the mill relative to the surface being machined so that an angle between the mill axis and a line normal to each profiled point of the surface is substantially smaller than a right angle; and shaping the curvilinear surface of said blank with the end face of the mill; conjugation surfaces at concave portions of a workpiece mating with the profile thereof being formed by relative displacement of the blank and mill in performing a successive profiling of points of said surfaces beginning from the intermediate part of a respective concave portion of the workpiece towards the edges thereof.

9. A method for machining curvilinear surfaces of workpieces of the type of turbine blades by circular milling comprising: rotating a blank and mill and applying thereto a profile generation displacement with respect to the rotational axis of the blank imparting to the blank and mill a relative displacement along the rotational axis of the blank and the profile generation displacement during rotation of the blank and mill, the direction of said profile generation displacement being at an angle from substantially 45° to 135° with respect to the rotational axis of the blank, said relative displacement being imparted at an angle substantially smaller than a right angle with respect to the rotational axis of the blank and to the direction of said profile generation displacement; positioning the mill relative to the surface being machined so that an angle between the surface is substantially smaller than a right angle; and shaping the curvilinear surface of said blank with the end face of the mill; imparting a relative alternating motion to the blank and mill along the blank axis.

* * * * *